United States Patent [19]
Gomi et al.

[11] 4,186,218
[45] Jan. 29, 1980

[54] PROCESS FOR PREPARING IMPROVED SOY PROTEIN MATERIALS

[75] Inventors: Teruo Gomi, Yokohama; Yuji Hisa; Takahiko Soeda, both of Kawasaki, all of Japan

[73] Assignee: Ajinomoto Company, Incorporated, Tokyo, Japan

[21] Appl. No.: 889,340

[22] Filed: Mar. 23, 1978

Related U.S. Application Data

[63] Continuation-in-part of Ser. No. 790,440, Apr. 25, 1977, Pat. No. 4,113,716.

[30] Foreign Application Priority Data

Jan. 10, 1978 [JP] Japan .................................. 53-1454

[51] Int. Cl.² ............................ A23J 1/14; A23L 1/20
[52] U.S. Cl. ..................................... 426/598; 426/634; 426/656; 426/507; 260/123.5
[58] Field of Search ............... 426/634, 656, 507, 598; 260/123.5

[56] References Cited

U.S. PATENT DOCUMENTS

| | | | |
|---|---|---|---|
| 3,537,859 | 11/1970 | Hamdy | 426/656 X |
| 3,694,221 | 9/1972 | Hoer et al. | 426/656 X |
| 3,764,708 | 10/1973 | Aonuma et al. | 426/507 X |
| 4,054,679 | 10/1977 | Meller et al. | 426/656 |

*Primary Examiner*—Robert A. Yoncoskie
*Attorney, Agent, or Firm*—Oblon, Fisher, Spivak, McClelland & Maier

[57] ABSTRACT

A process particularly designed to further improve soy protein previously denatured by superheating treatment and/or alcohol extraction comprises ejecting an aqueous slurry of the denatured soy protein through an orifice into a holding chamber under prescribed conditions. Nitrogen Solubility Index is improved.

16 Claims, No Drawings

PROCESS FOR PREPARING IMPROVED SOY PROTEIN MATERIALS

This is a continuation-in-part of co-pending application Ser. No. 790,440, filed Apr. 25, 1977, now U.S. Pat. No. 4,113,716.

BACKGROUND OF THE INVENTION

1. Field of the Invention

This invention relates to a process for preparing improved soy protein materials from denatured soy protein, and more particularly to a process for preparing improved soy protein materials from soy protein denatured by superheating treatment or alcohol extraction.

2. Description of the Prior Art

Heretofore, soy protein materials such as extracted and isolated soy proteins have been prepared from defatted soybean flake material having a high NSI (Nitrogen Solubility Index) of not less than 85% in high yields, which are usually obtained by desolventizing solvent-extracted soybean meal or flakes at a low temperature. The basic process for producing extracted soy protein comprises dispersing defatted soybean flake material having a high NSI in water at a weight ratio of flake material to water of between 1 to 5 and 1 to 15, extracting water-soluble materials from the flakes at pH 6.5 to 9.0, and separating insoluble materials from the resulting extract solution, and further comprises the steps of concentration, sterilizing and spray-drying, if necessary. Isolated protein has been prepared by adding an acid to lower the pH of the above-mentioned extract solution to about the isoelectric point of the protein, which is between about 4 and 5, collecting the precipitated protein and discarding the whey and excess liquor, and neutralizing the collected protein, and further comprises steps of concentration, sterilizing and spray-drying, if necessary. In accordance with the above processes, the yields of the extracted and isolated proteins are usually 60 to 65% and 30 to 35%, respectively.

Although superheating treatment and alcohol extraction give excellent properties to defatted soybeans, the solubility of the protein therein is unavoidably decreased to an NSI of 5 to 70%. Therefore, even if the above known processes are applied to such defatted soybeans denatured by superheating treatment and/or alcohol extraction, the yields of the extracted and isolated proteins are decreased to less than 50% and less than 20% respectively, making industrialization of such processes unattractive.

A need therefore continues to exist for a method of improving the NSI of denatured, defatted soy protein.

SUMMARY OF THE INVENTION

Accordingly, one object of the present invention is to provide a process for preparing soy protein having improved solubility.

Another object of the invention is to provide processes for producing extracted soy protein, isolated soy protein, and soy milk having improved color and flavor.

A further object of the invention is to provide a process for producing denatured defatted soy protein having improved solubility which is commercially advantageous.

Briefly, these objects and other objects of the invention as hereinafter will become more readily apparent can be attained by providing a process wherein the NSI of denatured defatted soybean flake material is recovered by ejecting an aqueous slurry of the same through an orifice into a holding chamber under an elevated pressure. According to the process of this invention, soy protein materials obtainable by separating insoluble matter from protein such as extracted and isolated soy proteins are produced from the denatured defatted soybeans in improved yields, and as regards other soy protein materials such as concentrated soy protein, the same having an improved NSI is produced. Furthermore, the present invention provides soy protein materials having properties which cannot be obtained, or are superior to properties obtained by using undenatured defatted soybean flakes as starting materials.

DETAILED DESCRIPTION OF THE PREFERRED EMBODIMENT

The soybeans forming the starting material are ground or crushed, and the oil is extracted with solvents such as hexane to leave soybean meal or flakes, which are desolventized in a device commonly known as a Desolventizer Toaster. During this operation, the meal or flakes are superheated in the presence of steam, and enzymes therein such as lipoxygenase and urease are inactivated. However, the solubility of soy protein therein is decreased to an NSI of 5 to 60%. Such defatted soybean flake material denatured by superheating in various manners is used as one of the starting materials.

Defatted soybean flake material denatured by alcohol extraction can also be used as a starting material, and is usually prepared in the following manner.

When undenatured defatted soybean flake material is contacted with alcohols such as ethanol, propanol, or a mixture of hexane and alcohol at a temperature between room temperature and the boiling point of the solvent, yellow coloring matter together with the characteristic "beany" flavor and objectionable bitter taste of soybeans are largely removed. However, at the same time, the solubility of the protein is decreased as it is in superheating treatment. The extent of denaturation by alcohol extraction depends largely upon the extraction temperature and the water content in the solvent. The higher the extraction temperature, the more extensive is the denaturation. When using an aqueous alcohol as solvent, the maximum denaturation occurs at a water content of about 30%. Although the decrease of the NSI can be reduced by increasing the water content, the removal of alcohol-soluble matter (bitter substances) such as saponins, oily substances, aldehydes and ketones is also suppressed thereby. Therefore, the use of anhydrous alcohol is preferable in view of both the decrease of the NSI and the removal of alcohol-soluble materials. However, the influence of anhydrous alcohol on the NSI is also correlative with the extraction temperature. The optimum conditions of alcohol extraction may be readily determined by experiments, the above-mentioned factors being considered. There is yielded defatted soybean flake material which is denatured by alcohol, and by superheating if it has been, or is involved in the process of desolventizing hexane or alcohol, which has an NSI of not more than 70% and usually not less than 5%.

In accordance with the process of this invention, the NSI of such denatured soybean flake material is recovered. More specifically, the denatured soybean flake material is dispersed in water at a weight ratio of flake material to water of between 1 to 4 and 1 to 20, preferably between 1 to 5 and 1 to 15. It is not necessary to adjust the pH of the slurry, but the slurry is preferably adjusted to pH 6.5 to 9.0 with an alkali such as sodium hydroxide. The starting flake material is ground in the dry stage or in the stage of the slurry, if desired. For the NSI recovery by the present invention, it is also effective to add to the slurry reducing agents such as sodium hydrogen sulfite, ascorbic acid, and cystine; and surface active agents such as sorbitan fatty acid ester, glycerin fatty acid ester, sucrose fatty acid ester and lecithin. The optimum amount of the agent varies depending upon the kind of agents, the concentration of flake material, and the conditions of the NSI recovery step, and is readily determined by experiment. Generally, the agent is used in an amount of 0.05 to 2% by weight to the flake material on a dry basis.

The aqueous slurry so obtained is treated directly, or after extracting soluble materials mainly consisting of protein and sugars from the flake material by allowing the slurry to stand, preferably with stirring, for more than 5 minutes, usually for 10 to 60 minutes. This latter extraction procedure is not essential, but may be effective for carrying out the subsequent NSI recovery step of this invention efficiently. The particular amount of water is not critical, although it influences the efficiency of the subsequent NSI recovery step, and the separation of insoluble materials from the treated slurry and the concentration of the treated slurry, which are optionally made.

The pH of the slurry is related to the effect and efficiency of the NSI recovery of this invention, and to the time needed if an optional extraction is to be made. These steps can be carried out in a weak acidic pH range as described hereinbefore, but an alkaline pH range, especially a pH of 7 to 8 is preferred. The slurry is then ejected through an orifice under an elevated pressure. The optimum pressure on the slurry varies depending upon the concentration, mesh size, and NSI of the flake material, the desired NSI of the treated material and the temperature of the slurry, but the effect appears when the pressure drop during ejection is not less than 1 kg/cm$^2$, and preferably not less than 2 kg/cm$^2$. The upper limit of the pressure drop is not critical, but an extremely high pressure drop is not necessary. Usually, the upper limit is 30 kg/cm$^2$, more practically 20 kg/cm$^2$ for an industrial process where safety and stable operation must be considered.

The temperature of the slurry in the holding chamber is also related to the effect and efficiency of the NSI recovery, and the quality of the protein in the treated slurry. The higher the temperature, the more extensive is the NSI recovery. It is thus preferred to employ a temperature of not less than 70° C., preferably not less than 80° C., although the NSI recovery is possible even at 20° C. However, an extremely high temperature decreases the gel-forming ability. The upper limit of the temperature is usually 180° C., but it is 140° C. for producing soy protein material having a high gel-forming ability.

If it is desired to use a high temperature, as described hereinabove, it is necessary to heat the ejected slurry. This may be accomplished by heating the starting slurry in advance or by heating the slurry with suitable heating agents such as steam just before or after ejection. When heating the slurry after ejection, it is preferred to introduce—more practically to blow—steam into the ejected slurry at a point just past the orifice, whereby the slurry is instantly heated. The ejected and heated slurry is retained without an appreciable drop in temperature in a holding chamber, usually an elongated tube. The duration of the retention period is of secondary importance, since a similar result is obtained regardless of the length of the retention period. The ejected and heated slurry may be retained for a very short period such as less than 0.5 second or for a substantially longer period such as 15 minutes. The retention period is easily adjusted for safe and steady operation by varying the length of an elongated tube used as the holding chamber, and is usually in the range of 1 second to 10 minutes.

Currently, the most satisfactory method of achieving the treatment of the invention is to pass the slurry through a device commonly known as a Jet Cooker. It includes a jet nozzle orifice through which the slurry is ejected under an elevated pressure into an elongated tube functioning as a holding chamber. The jet nozzle may incorporate another orifice, normally concentric, or alternatively the tube may contain a device for blowing steam along or at right angles to the direction of ejection at a point just after the jet nozzle orifice, so that the slurry is instantly heated by the steam. The pressure on the slurry is then instantly released by discharging the slurry to a reduced pressure zone, into a suitable receiving means. This causes flash-off vaporization of a portion of the moisture in the form of water vapor which causes substantial and rapid cooling of the remaining slurry. However, the rapid cooling of the slurry is not critical to the NSI and other properties of the final product.

According to the process of this invention, the NSI of the treated flake material is higher than the NSI of the starting flake material by at least 5%, usually by at least 10%, although the increase of NSI varies depending upon the NSI of the starting flake material and the treatment conditions. The lower the NSI of the starting flake material, the more extensive is the NSI recovery. Extracted and isolated soy proteins may be obtained in yields comparable with those achieved by using undenatured defatted soy flake material as starting material, by separating insoluble materials, and the whey if necessary, from the treated slurry, followed by concentration, sterilizing and drying. Furthermore, the process of this invention does not substantially impart any undesireable characteristics to the protein, and provides protein materials having excellent properties which cannot be obtained, or are superior to those obtained by using undenatured defatted soybean flakes as starting materials.

As apparently understood from the above description, a similar result is obtained when denatured defatted soybean flake material is subjected to the whey separation by conventional pH adjustment and the resultant material mainly consisting of protein and insoluble materials is used as the material to be ejected. In this case, a starting aqueous slurry to be subjected to the NSI recovery may be obtained by dispersing denatured defatted soybean flake material in water at a weight ratio of flake material to water of 1:5 to 15, adding an acid to lower the pH of the resultant slurry to about the isoelectric point of the protein, separating the precipitated protein with insoluble materials from the whey and excess liquor, dispersing the precipitate and insoluble material in water at a weight ratio of precipitate to water of between 1 to 4 and 1 to 20, preferably 1 to 5 and 1 to 15, and neutralizing the resultant slurry to pH 6.5 to 9.0.

According to this procedure, improved concentrated and isolated soy proteins may be obtained by separating insoluble materials if necessary, followed by concentration, sterilizing and drying.

When the protein materials are produced from defatted soybean flakes denatured by superheating treatment in accordance with the process of this invention, they have almost the same foaming ability and emulsifying ability as those of protein materials produced from undenatured defatted soybean flakes. Furthermore they have a higher solubility in water and sodium chloride solution, and are essentially free of the characteristic "beany" flavor of soybeans.

When the protein materials are produced from defatted soybean flake material denatured by alcohol extraction in accordance with the process of this invention, they have a higher solubility in both water and sodium chloride aqueous media, and a higher emulsifying ability. Moreover, they lack the characteristic "beany" flavor and the objectionable bitter taste of soybeans, and give a more brilliant and clearer white aqueous solution than the usual protein materials produced from undenatured defatted soybean flakes. Furthermore, if the NSI of the former materials has been recovered at not more than 140° C., the gel-forming ability and the foaming ability of the former materials are respectively about two to five times those of the latter, and the former materials make a more brilliant and clearer gel than the latter.

The pressure ejected slurry can be further treated using conventional techniques, and the dried protein products so obtained have excellent properties. Alternatively, it can be used directly to prepare food products having excellent properties. For example, since the protein material of this invention has a high NSI and lacks "beany" flavor, it can be preferably used for the preparation of soy milk of high quality. The pressure ejected slurry of the material, preferably that obtained from defatted soybean flake material denatured by alcohol extraction, is mixed with edible oil such as palm oil, rice oil or rape oil at a weight of protein to oil of between 1:0.7 and 1:2, and emulsified, preferably at an elevated pressure of more than 200 kg/cm², with or without prior separation of insoluble matter from the slurry. If the soy milk is prepared without separation of the insoluble matter, the above emulsification under an elevated pressure is effective and preferred for preparing a more homogeneous and stable emulsion.

The following diagram summarizes examples of the aforementioned further conventional treatments which, when combined with the treatment of the present invention, lead in high yield to soy protein products having improved solubility.

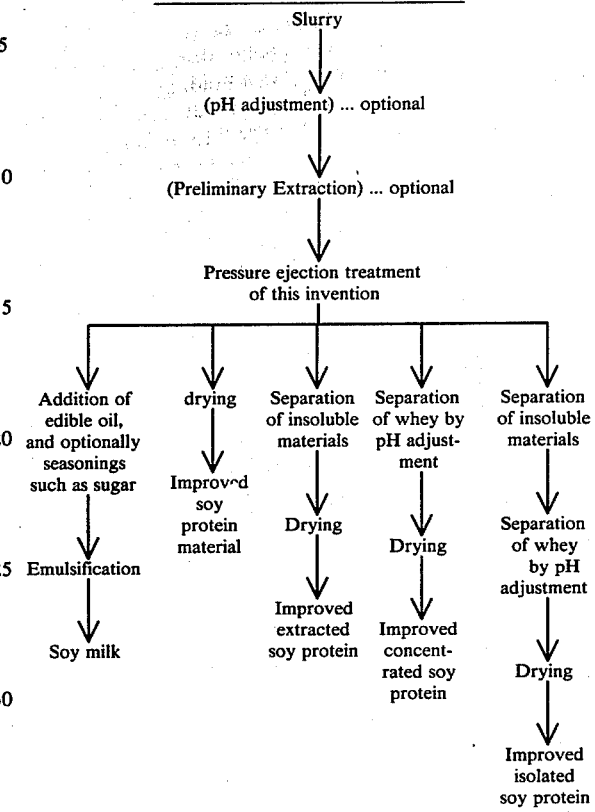

Typical Industrial Applications of
The Process of the Invention

Having generally described this invention, a further understanding can be obtained by reference to certain specific examples which are provided herein for purposes of illustration only and are not intended to be limiting unless otherwise specified.

The characteristic properties used in the examples have the following meanings:

NSI: Percent dissolved total nitrogen in water at 40° C.

NSI in 10% NaCl aqueous soln.: percent dissolved total nitrogen in 10% NaCl aqueous solution at 5° C.

Emulsifying Ability: percent formed emulsion by emulsifying a mixture of 50 g water, 50 g corn oil and 1.5 g sample at 15,000 rpm for 5 minutes, followed by centrifugation at 600 G for 10 minutes.

Emulsifying Ability in the presence of NaCl: Emulsifying Ability obtained by adding 2.5 g NaCl into the mixture to be emulsified in the above procedure.

Gel-Forming Ability: strength of gel obtained by heating a mixture of sample and water (protein content: 20%) at 90° C. for 50 minutes, which is measured by using a spherical plunger having a diameter of 5 mm.

Foaming Ability: Volume of foam obtained by stirring a 1% sample solution at 1,360 rpm for 10 minutes and allowing the resulting solution to stand for 10 minutes.

EXAMPLE 1

Defatted soybean flakes were desolventized in a desolventizer toaster to give denatured defatted soybean flakes having an NSI of 50%. 10 kg of the flakes were dispersed in 70 l of water, and the resultant slurry was adjusted to pH 7.0 with sodium hydroxide.

The flakes in the slurry were ground. The resultant slurry was ejected through an orifice into an elongated tube serving as a holding chamber at a pressure drop of 10 kg/cm$^2$, steam was blown into the ejected slurry if necessary to raise it to the temperature listed in Table 1, and the heated slurry was retained for five minutes at the desired temperature. The insoluble materials therein were then separated, and a sample of the resultant solution was taken out and analyzed to determine the NSI of the treated flakes. The results are summarized in Table 1.

Table 1

| Temperature (°C.) | NSI of the Treated Flakes (%) |
| --- | --- |
| 20 | 79 |
| 50 | 82 |
| 80 | 93 |
| 100 | 100 |
| 120 | 100 |

EXAMPLE 2

A slurry having a pH of 7.0 prepared in the same manner as in Example 1 was treated with 50 g sodium hydrogen sulfite. The resultant slurry was treated in the same manner as in Example 1, with the temperature of the treated slurry in the holding chamber being kept at 50° C. The NSI of the treated flakes was 87%.

EXAMPLE 3

Defatted soybean flakes were desolventized in a desolventizer toaster to give denatured defatted soybean flakes having an NSI of 55%. 10 kg of the flakes were dispersed in 90 l of water at 50° C., and the resultant slurry was adjusted to pH 7.1 with sodium hydroxide. The material was then extracted for 30 minutes.

The resultant slurry was ejected through an orifice at a pressure drop of 7 kg/cm$^2$ to a holding chamber with steam being blown into the ejected slurry, and retained at 120° C. for 2 minutes. The insoluble materials therein were separated by decantation, and a sample of the resultant solution was taken out and analyzed. As a result, it was found that 100% of the total nitrogen of the starting flakes existed in the treated slurry in the water soluble form (NSI of the treated flakes=100%).

The resultant solution was spray dried to give 6.3 kg of extracted soy protein powder having a protein content of 62% (Yield 63%). The characteristics of the powder were as follows:
NSI: 99%
NSI in 10% NaCl aqueous soln.: 80.3%.
Emulsifying Ability: 85%
Gel-Forming Ability: 328 g

EXAMPLE 4

A slurry was prepared in the same manner as in Example 3, and adjusted to pH 8.0 with sodium hydroxide. The material was then extracted for 30 minutes.

The resultant slurry was ejected through an orifice at a pressure drop of 6 kg/cm$^2$ to a holding chamber with steam being blown into the ejected slurry, and retained at 110° C. for 3 minutes. The insoluble materials were separated by decantation, and a sample of the resultant solution was taken out and analyzed. As a result, it was found that 100% of the total nitrogen of the starting flakes existed in the treated slurry in the water soluble form.

The resultant solution was adjusted to pH 4.2 with sulfuric acid to precipitate the soy protein. The precipitate was separated from the whey and excess liquor by decantation. 26 kg of the precipitate was dispersed in 25 l of water and the resultant slurry was adjusted to pH 7.0 with sodium hydroxide. The resultant solution was mixed well by an emulsifier and spray-dried to give 3.2 kg of isolated soy protein powder having a protein content of 89.8% (Yield 32%). The characteristics of the powder were as follows:
NSI: 97%
Emulsifying Ability: 100%
Gel-Forming Ability: 356 g

EXAMPLE 5

Defatted soybean flakes previously denatured by superheating and alcohol extraction having an NSI of 8% were treated in the same manner as in Example 1, the slurry in the holding chamber being kept at the temperature listed in Table 2. The results are summarized in Table 2.

Table 2

| Temperature (°C.) | NSI of the Treated Flakes (%) |
| --- | --- |
| 50 | 27 |
| 90 | 46 |
| 130 | 100 |

EXAMPLE 6

Defatted soybean flakes previously denatured by alcohol extraction having an NSI of 42% were treated in the same manner as in Example 1, the slurry in the holding chamber being kept at the temperature listed in Table 3. The results are summarized in Table 3.

Table 3

| Temperature (°C.) | NSI of the Treated Flakes (%) |
| --- | --- |
| 50 | 65 |
| 100 | 99 |

EXAMPLE 7

10 kg undenatured defatted soybean flakes was suspended in 20 l of a mixture of ethanol and water (9:1, V/V), and kept at 50° C. for 1 hour. The flakes were then desolventized to give 8.9 kg of bright yellow denatured defatted soybean flakes lacking the characteristic "beany" flavor of soybeans. The NSI of the flakes was 21%.

The flakes were suspended in water and then treated as in Example 4. The insoluble materials were separated from the treated slurry, and a sample of the resultant solution was taken out and analyzed. As a result, 83% of the total nitrogen of the starting flakes was found to exist in the treated slurry in the water soluble form.

The resultant solution was treated as in Example 4 to give 3.1 kg of bright yellow isolated soy protein powder lacking the beany flavor and the objectionable bitter taste of soybeans (Yield 31%). The characteristics of the powder were as follows:
NSI: 78%
Emulsifying Ability: 100%
Gel-Forming Ability: 711 g

EXAMPLE 8

10 kg of undenatured defatted soybean flakes was dispersed in 20 l of a mixture of ethanol and water (92:8, V/V), and kept at 25° C. for 2 hours. The flakes were desolventized to give 9.1 kg of denatured defatted soybean flakes having an NSI of 42%. The flakes were ground, and suspended in water at a weight ratio of flakes to water of 1 to 10, and the resultant slurry was adjusted to pH 7.5 and allowed to stand for 30 minutes. The resultant slurry was ejected through an orifice to a holding chamber at a pressure drop of 10 kg/cm$^2$ with steam being blown into the ejected slurry, and retained at 130° C. for 1 minute. A sample of the treated slurry was taken out and analyzed after the insoluble materials were separated out. As a result, 100% of the total nitrogen of the starting flakes was found to exist in the treated slurry in the water soluble form.

The treated slurry was adjusted to pH 7.0, and spray dried to give 8.5 kg of bright yellow soy protein powder. The characteristics of the powder were as follows:
NSI: 95%
Emulsifying Ability: 100%
Gel-Forming: 685 g

EXAMPLE 9

1 kg of undenatured defatted soybean flakes was dispersed in 4 l of anhydrous ethanol and kept at room temperature for 2 hours. The flakes were filtered out, washed with fresh anhydrous ethanol, and desolventized in vacuo at 70° C. The NSI of the denatured soybean flakes obtained was 63%.

910 g of the denatured flakes was suspended in 10 l of water, ejected through an orifice to a holding chamber at a pressure drop of 4 kg/cm$^2$ with steam being blown into the ejected slurry and retained at 90° C. for 2 minutes. The treated slurry was filtered and the resultant cake was washed with 2 l of water to give 11 l of the extraction solution (solids content 5.9%, protein content 3.5%). These figures showed that 91% of the total nitrogen of the starting flakes existed in the treated slurry in the water soluble form.

The extraction solution was adjusted to a protein conteent of 3%, and mixed with palm oil to an oil content of 4.2%. The mixture was then emulsified at 400 kg/cm$^2$. The resultant emulsion was mixed with sugar to a sugar content of 1%, and sterilized at 125° C. for 30 seconds to give soy milk having neither beany flavor nor bitter taste.

EXAMPLE 10

10 kg of undenatured defatted soybean flakes was dispersed in 20 l of 95% ethanol and the resultant slurry was allowed to stand at the boiling point (about 78° C.) for 2 hours. The flakes were filtered out, washed with fresh 95% ethanol and dried to give 9.0 kg of denatured flakes having an NSI of 17%.

The denatured flakes were ground and dispersed in 94 l of water. The resultant slurry was adjusted to pH 7.5, ejected through an orifice into a holding chamber at a pressure drop of 10 kg/cm$^2$ with steam being blown into the ejected slurry, and maintained at 130° C. for 2 minutes. The treated slurry was filtered to give an extraction solution. The solution was adjusted to pH 7.0 and spray dried to yield 6.5 kg of extracted soy protein powder having a protein content of 63%. The characteristics of the powder were as follows:
NSI: 97%
NSI in 10% NaCl aqueous soln.: 95%
Emulsifying Ability in the presence of NaCl: 88%
Gel-Forming Ability: 686 g
Foaming Ability: 250 ml

EXAMPLE 11

Defatted soybean flakes were desolventized in a desolventizer toaster to give denatured defatted soybean flakes having an NSI of 40%. 10 kg of the flakes was dispersed in 130 l of water at 50° C. The resultant slurry was adjusted to pH 4.5 to precipitate the protein with insoluble materials. The precipitate was separated from the whey and excess liquor. The precipitate separated was dispersed in 90 l of water, and ground in the resultant slurry while adjusting the slurry to pH 7.0.

The resultant slurry was ejected through an orifice at a pressure drop of 8 kg/cm$^2$ to a holding chamber with steam being blown into the ejected slurry, and retained at 120° C. for two minutes to give 126 kg of the treated slurry. A sample of the treated slurry was taken out, the insoluble materials therein were separated by decantation, and analyzed. As a result, it was found that 95% of the total nitrogen of the starting flakes existed in the treated slurry in water soluble form.

63 kg of the treated slurry was spray dried to give 3.5 kg of concentrated soy protein powder having a protein content of 71%.

The insoluble materials were separated from the other 63 kg of the treated slurry by decantation. The resultant solution was spray dried to give 2.1 kg of isolated protein powder having a protein content of 91%.

The characteristics of these two powders are summarized in Table 4.

Table 4

| Characteristics | Concentrated | Isolated |
|---|---|---|
| NSI | 93% | 98% |
| Emulsifying Ability | 82% | 100% |
| Gel-Forming Ability | 325 g | 352 g |

Having fully described this invention, it will be apparent to one of ordinary skill in the art that many changes and modifications can be made thereto without departing from the spirit or scope of the invention set forth herein.

What is claimed as new and intended to be secured by Letters Patent is:

1. A process for preparing soy protein material having improved solubility which comprises preparing an aqueous slurry of denatured defatted soybean flake material having a weight ratio of said flake material to water of between 1 to 4 and 1 to 20, and ejecting said aqueous slurry through an orifice into a holding chamber at a pressure drop of at least 1 kg/cm$^2$; wherein the NSI of soy protein in said denatured defatted soybean flake material is not more than 70%, and the NSI of soy protein in the resultant pressure ejected slurry is higher than that of said denatured defatted soybean flake material by at least 5%.

2. The process of claim 1, wherein said denatured defatted soybean flake material is obtained by subjecting defatted soybean flake material to at least one of superheating treatment or alcohol extraction.

3. The process of claim 1, wherein said aqueous slurry of denatured defatted soybean flake material is adjusted to pH 6.5 to 9 prior to ejection.

4. The process of claim 1, wherein said aqueous slurry prior to ejection is permitted to stand for a period of time sufficient to extract water-soluble materials from said flake material.

5. The process of claim 1, which further comprises addition of edible oil to the resultant ejected slurry and emulsification in order to obtain a soy milk.

6. The process of claim 1, which further comprises drying said pressure ejected slurry to obtain an improved soy protein material.

7. The process of claim 1, which further comprises separating insoluble materials from said resultant pressure ejected slurry to obtain a solution.

8. The process of claim 7, which further comprises drying said solution to obtain an improved extracted soy protein.

9. The process of claim 1, which further comprises adjusting said pressure ejected slurry to the pH of about the isoelectric point of the protein to precipitate the protein, separating total solids after said precipitation from the whey and excess liquor, dispersing said solids in water, and neutralizing the resultant mixture.

10. The process of claim 9, which further comprises drying said neutralized mixture to obtain an improved concentrated soy protein.

11. The process of claim 7, which further comprises adjusting said solution to the pH of about the isoelectric point of the protein to precipitate the protein, separating said precipitated protein from the whey and excess liquor, dispersing said precipitated protein in water, and neutralizing the resultant mixture.

12. The process of claim 11, which further comprises drying said neutralized mixture to obtain an improved isolated soy protein.

13. The process of claim 1, wherein said starting aqueous slurry is prepared by dispersing said flake material in water, adjusting the resultant slurry to the pH of about the isoelectric point of the protein to precipitate the protein with insoluble materials, separating said precipitate and insoluble materials from the whey and excess liquor, dispersing said precipitate and insoluble materials in water, and neutralizing the resultant slurry to pH 6.5 to 9.0.

14. The process of claim 13, which further comprises drying said resultant pressure ejected slurry to obtain an improved concentrated soy protein.

15. The process of claim 13, which further comprises separating insoluble materials from said resultant pressure ejected slurry to obtain a solution.

16. The process of claim 15, which further comprises drying said solution to obtain an improved isolated soy protein.

* * * * *